United States Patent
Chi et al.

(10) Patent No.: US 9,450,520 B2
(45) Date of Patent: Sep. 20, 2016

(54) SPACE VECTOR PULSE MODULATION BASED MOTOR DRIVER

(71) Applicant: Analog Devices, Inc., Norwood, MA (US)

(72) Inventors: Xiaoming Chi, Woburn, MA (US); Bin Huo, Wayland, MA (US)

(73) Assignee: ANALOG DEVICES, INC., Norwood, MA (US)

( * ) Notice: Subject to any disclaimer, the term of this patent is extended or adjusted under 35 U.S.C. 154(b) by 0 days.

(21) Appl. No.: 14/571,124

(22) Filed: Dec. 15, 2014

(65) Prior Publication Data

US 2016/0173004 A1 Jun. 16, 2016

(51) Int. Cl.
*H01L 41/04* (2006.01)
*H02N 2/00* (2006.01)

(52) U.S. Cl.
CPC .................................. *H02N 2/008* (2013.01)

(58) Field of Classification Search
CPC ........................................................ H02P 7/29
USPC ........................................... 318/116, 599, 34
See application file for complete search history.

(56) References Cited

U.S. PATENT DOCUMENTS 6,337,801 B2 * 1/2002 Li .................................. 363/127
6,462,974 B1 * 10/2002 Jadric ................... H02M 1/4216
                                                                    363/127
6,819,078 B2    11/2004 Ho
6,900,998 B2 *  5/2005 Erickson ............... H02M 5/297
                                                                    290/44

FOREIGN PATENT DOCUMENTS

EP          2216894 B1      8/2014

OTHER PUBLICATIONS

Sutikno et al., "Simple Realization of 5-Segment Discontinuous SVPWM Based on FPGA", International Journal of Computer and Electrical Engineering, vol. 2, No. 1, Feb. 2010, pp. 148-157.
Kartheek et al., "An Optimized Code for Space Vector PWM for a Two Level Voltage Source Inverter", International Journal of Science and Modern Engineering (IJISME), ISSN: 2319-6386, vol. 1, Issue-5, Apr. 2013, pp. 50-52.

* cited by examiner

*Primary Examiner* — David S Luo
(74) *Attorney, Agent, or Firm* — Patent Capital Group

(57) ABSTRACT

A motor driver may include a controller, a space vector modulator, a converter and a detector. The space vector modulator may generate driving signals under control of the controller according to a space vector pulse width modulation ("SVPWM") scheme. The converter may derive AC signals from the driving signals received from the space vector modulator and may output the AC signals to the USM motor. The detector may generate feedback signals representing current and voltage supplied to the USM motor. The controller may revise estimates of space vectors, based on measurements from the detector, to control the space vector modulator to adjust frequencies, amplitudes, or phase angles of the plurality of AC signals.

20 Claims, 6 Drawing Sheets

100

200

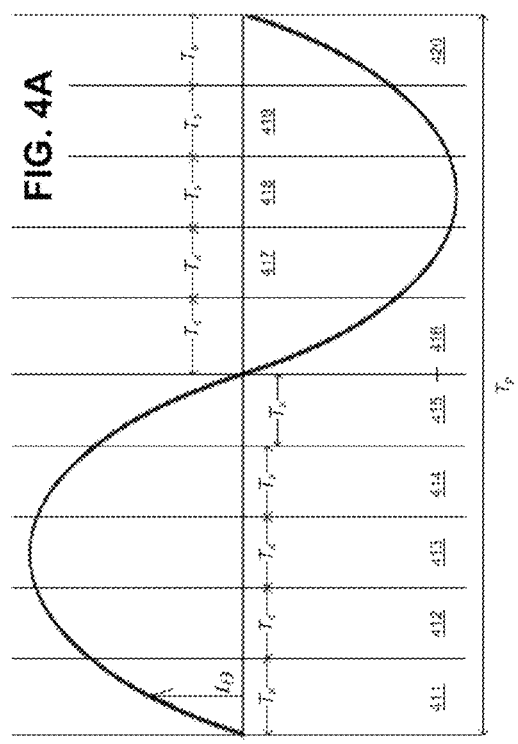
FIG. 4A
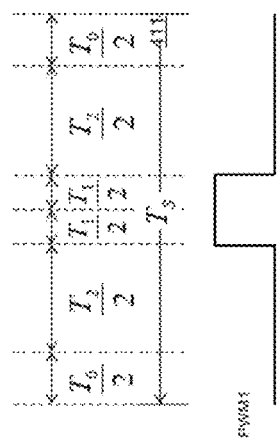
FIG. 4C
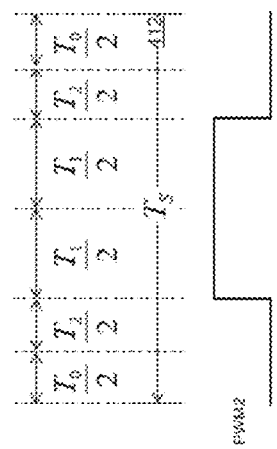
FIG. 4D
FIG. 4B

500

600

SPACE VECTOR PULSE MODULATION BASED MOTOR DRIVER

BACKGROUND

An ultrasonic motor (USM) is a type of electric motor that causes ultrasonic vibrations in piezoelectric elements in the motor, which in turn induces motion of motor components. Comparing to other types of motors, USMs have lower vibrations. Thus, USMs may be used as actuators in low vibration applications such as camera motors.

USMs may be driven by alternating current ("AC") signals. Ideally, for efficiency, the driving signals that are applied to a USM would be tuned in frequency, phase and/or amplitude to match operational characteristics of the USM. Driver circuits that generate the driving signals typically are designed to match reference characteristics of a USM, for example, the characteristics identified by USM manufacturers in their data sheets. In practice, however, characteristics of manufactured USMs do not always match their reference characteristics. Characteristics of USMs may vary from the reference characteristics across different manufactured lots due to manufacturing variances. Characteristics of a single USM also may vary over time at the USM ages. Traditional driver circuits oftentimes cannot adjust their driving signals to compensate for these variances.

Thus, there remains a need for a motor drive control system that responds dynamically to changing operating conditions in an ultrasonic motor.

BRIEF DESCRIPTION OF THE DRAWINGS

FIG. 4A illustrates a portion of an idealized sinusoidal signal for an exemplary scheme for generating a sinusoidal signal according to an embodiment of the present invention.

FIG. 4B illustrates a vector space for an exemplary scheme for generating a sinusoidal signal according to an embodiment of the present invention.

FIG. 4C illustrates a timing diagram for an exemplary scheme for generating a sinusoidal signal according to an embodiment of the present invention.

FIG. 4D illustrates a timing diagram for an exemplary scheme for generating a sinusoidal signal according to an embodiment of the present invention.

DETAILED DESCRIPTION

Embodiments of the present invention provide a motor driver control system that responds dynamically to changing conditions of its associated motor. The system may include a controller, a space vector modulator, a converter and a detector. The space vector modulator may generate driving signals under control of the controller according to a space vector pulse width modulation ("SVPWM") scheme. The converter may derive AC signals from the driving signals received from the space vector modulator and may output the AC signals to the USM motor. The detector may generate feedback signals representing current and voltage supplied to the USM motor. The controller may revise estimates of space vectors, based on measurements from the detector, to control the space vector modulator to adjust frequencies, amplitudes, or phase angles of the plurality of AC signals.

Figure 1:
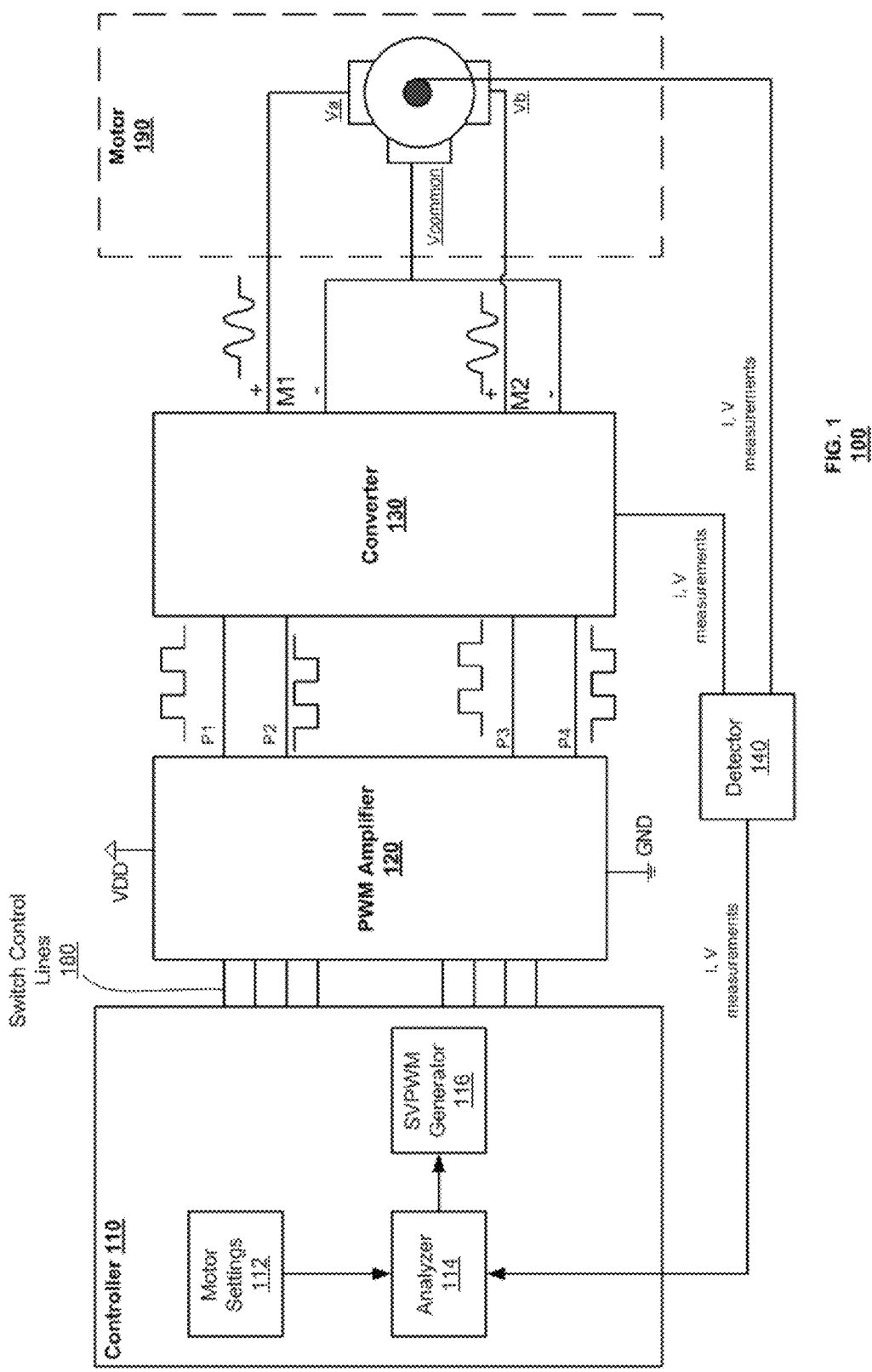
FIG. 1 illustrates a motor driver according to an embodiment of the present invention.

FIG. 1 illustrates a motor driver 100 according to an embodiment of the present invention. The motor driver 100 may include a controller 110, a PWM amplifier 120, a converter 130 and a detector 140. The PWM amplifier 120 may generate driving signals under control of the controller 110 according to a SVPWM scheme. The converter 130 may derive AC signals from the driving signals received from the PWM amplifier 120 and may output the AC signals to the USM motor 190. The detector 140 may generate feedback signals representing current and voltage supplied to the USM motor 190. The controller 110 may revise estimates of space vectors, based on measurements from the detector 140, to control the PWM amplifier 120 to adjust frequencies, amplitudes, or phase angles of the plurality of AC signals.

In practical implementation, the components of the motor driver 100 may be manufactured as one or more integrated circuits. Depending on the process technologies used, the controller 110 and PWM amplifier 120 may be manufactured in a common integrated circuit and converter 130 may be implemented by discrete on board devices such as inductors and capacitors. For example, provided the semiconductor components of a single integrated circuit are rated to handle AC signals output by the converter 130, these components can be manufactured in a single integrated circuit. Alternatively, the controller 110 might be manufactured on a first integrated circuit and the PWM amplifier 120 and converter 130 may be manufactured on a second integrated circuit; such an embodiment is appropriate where the process technologies of the controller 110 are not rated to handle driving voltages that would be applied to the USM 190. In either case, the motor driver 100 may be separate from but connected to the USM motor 190.

The controller 110 may operate according to an SVPWM scheme. SVPWM is a type of pulse width modulation ("PWM") scheme that uses a space vector representation of an AC signal to calculate timing sequences of PWM signals for generating AC waveforms. The controller 110 may drive the PWM amplifier 120 with a pattern of control signals derived according to SVPWM techniques.

The SVPWM control signals may be tailored for the motor 190 with which the motor driver 100 is being used. The controller 110 may store data identifying a set of motor settings for controlling the motor 190. The motor settings may be pre-stored in firmware or ROM, they may be stored in an adjustable memory (such as a RAM, EEPROM, or Flash memory) or they may be provided to the controller 110 via an external source (e.g., another circuits, user input, or from identifications provided by the motor 190 itself). These sources are identified as motor settings 112 in FIG. 1. The motor settings data may include information such as the motor's drive frequency, operating voltage range and phase offset, among others.

The controller 110 may also include an analyzer 114 to compare measured signals (such as the current or voltage waveforms) from the detector 140 against the motor settings to make adjustments to the SVPWM control signals. The analyzer may analyze the measured signals of voltage and current waveforms from the converter 130 (for example, to determine the voltage range of the AC signals (maximum to minimum voltages) or phase offset between the AC signals, etc.) and then compare the analyzed information to the motor settings. The analyzer 114 may further include memory to store history of measured signals and/or corresponding analysis, to further aid in analysis. The analyzer 114 may determine from the history whether the motor driver is driving the motor at optimal power efficiency (i.e. lowest average V*I), and make adjustments (for example, by trying multiple range of adjustments to see which one achieved the best power efficiency). The analyzer 114 also may convert high level settings from 112 to low level configurations for SVPWM generator 116. The analyzer 114 may send adjusted settings to a SVPWM generator 116 to generate control signals for controlling the plurality of switches for pulse modulation.

The SVPWM generator 116 may generate the space vectors each correspond to one of a plurality of modulation period of the plurality of the AC signals. The SVPWM generator 116 may control the PWM amplifier 120 by control output signals (P1, P2, P3, and P4) that are generated according to SVPWM. The SVPWM generator's output signals 180 may represent PWM waveforms from which motor driving signals are to be derived.

FIG. 1 illustrates a functional block diagram of a controller 110. When manufactured in an integrated circuit, the controller 110 may include circuit systems (not shown) that implement the functionality as illustrated. For example, the controller 110 may be provided with a processor programmed to perform pulse-number, frequency and/or phase calculations for the controller 110. The processor may have PWM calculation coefficients stored in code or, alternatively, a lookup-table ("LUT") to store the coefficients. Program code for the processor may be stored in accompanying memory. The controller 110 may further include input/output interface such as advanced peripheral bus ("APB") or others, to interface with other components and devices.

The PWM amplifier 120 may provide driving signals to the converter 130. The PWM amplifier 120 may include a pair of bridge circuits to generate a respective pair of driving signals P1, P2. The switches may be provided as transistors (for example, MOSFET transistors). In one embodiment, transistors may provide direct connections between voltage supplies (VDD, ground) and array outputs P1, P2, P3 and P4. In another embodiment, the PWM amplifier 120 may include filters or other circuitry to condition supply voltages before delivering them to the converter 130. The amplifier's output P1-P1 signals 180 may represent the PWM output from the controller 100 but at voltage and/or current levels that are appropriate to drive the motor 190.

The converter 130 may include an oscillator to generate AC signals from the pulse signals supplied by the PWM amplifier 120. The converter 130 may receive the modulated pulse signals in digital form and generate output signals that approximate sinusoidal AC signals. In one embodiment, the converter 130 may include an inductor-capacitor ("LC") based oscillator. The converter 130 also may include an isolation device to maintain galvanic isolation between the motor 190 and the motor driver 100. Further, the converter 130 may include filters to further condition the AC signals for delivery to the motor 190. In one embodiment, the low-pass filter may have frequency-dependent variable gain characteristics to adjust the amplitude of the AC signal by varying the frequency of modulation for the digital pulse signals at the input of the converter 130.

USM motors commonly include three input nodes (Va, Vb, Vcommon). In such an embodiment, the converter 130 may be connected to the motor 190, such that an input voltage Va, which is defined relative to Vcommon, may receive a first of the AC signals (M1). Similarly, an input voltage of Vb, which is defined relative to Vcommon, may receive a second of the AC signals (M2). The AC signals M1 and M2 may approximate sinusoidal waveforms. The AC signals M1 and M2 may have an approximately 90 degree phase offset relative to each other but the phase offset may be tailored according to performance of the motor 190 either as identified in the motor settings 112 or as derived in response to feedback information from the detector 140.

The detector 140 may measure operation of the motor 190. For example, the detector 140 may measure the voltage and/or the current at output terminals (for signals M1, M2) of the converter 130 to determine the actual voltage and current being consumed by the motor 190. The detector 140 may be connected either to the output terminals (for signals M1, M2) of the converter 130 or internal nodes within the converter 130 as may be convenient. In another embodiment, the detector 140 may be directly connected to built-in current or voltage sensors in the motor 190.

In one embodiment, the detector 140 may measure both the voltage and the current in the converter 130. In this fashion, the entire motor driver 100 may be integrated into a device, without requiring separate connections between the converter 130 and the motor 190 and between the detector 140 and the motor 190. However, other embodiments permit the detector 140 to be connected to the motor 190 to take more direct measurements.

Consider the motor driver 100 in operation. On startup, the motor driver 100 may be engaged and may perform diagnostic self-checks as are appropriate. As part of start up, the controller 110 may read settings 112 associated with its motor 190. The SVPWM generator 116 may derive a SVPWM driving pattern to be applied to the PWM amplifier 120 to induce the converter 130 to generate AC signals that are appropriate for the motor 190 according to the parameters identified in the settings 112. The controller 110 may generate control signals on switch control lines 180 according to the SVPWM driving pattern and the converter 130 may generate AC signals in response to pulses provided by the PWM amplifier 120.

The detector 140 may monitor signals returned from the motor 190 and/or controller 130. The detector 140 may generate a feedback signal to the controller 110 that represents parameters of the motor 190 in operation, which may deviate from expected parameters that were used to generate the motor settings 112. The analyzer 114 also may convert high level settings from 112 to low level configurations for SVPWM generator 116. The analyzer 114 may compare the feedback signal to values representing the expected parameters and generate data representing a difference between the two. The SVPWM generator 116 may revise its SVPWM driving pattern in response to the differential data provide by the analyzer 114.

Figure 2:
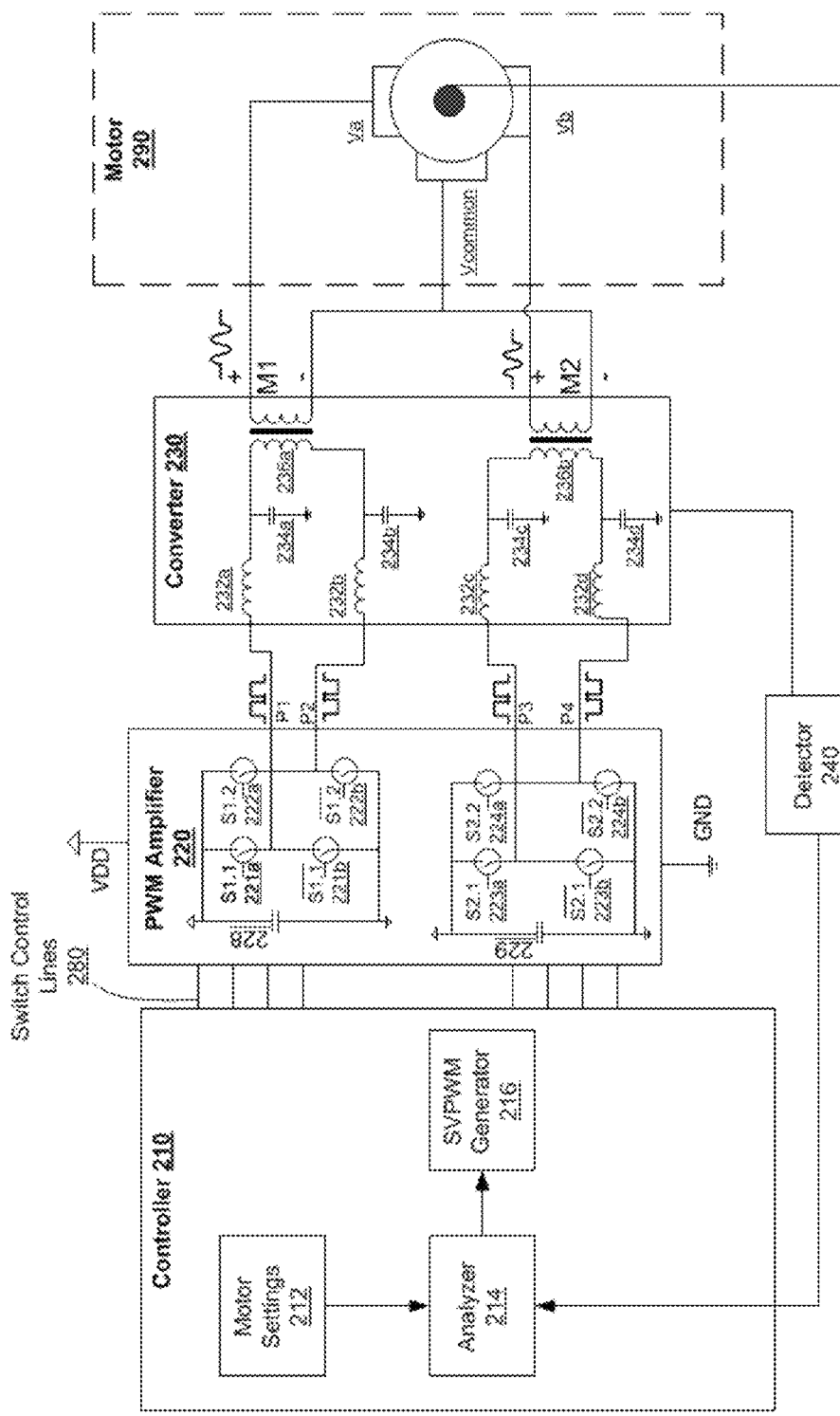
FIG. 2 illustrates a motor driver according to another embodiment of the present invention.

FIG. 2 illustrates an exemplary motor driver 200 according to another embodiment of the present invention. The motor driver 200 may find application as a motor driver 100 as illustrated in FIG. 1. Again, the motor driver 200 may include a controller 210, a PWM amplifier 220, a converter 230 and a detector 240. In this embodiment, the converter 230 may be differentially-driven by two pairs or pulse signals, P1 and P2, and P3 and P4.

The controller 210 may control the PWM amplifier 220 to generate a plurality of signals (P1, P2, P3, and P4), according to a SVPWM driving pattern. The converter 230 may convert the plurality of signals into a plurality of AC signals (M1 and M2) to drive a motor 290. The controller 210 may monitor, via the detector 240, current or voltage in the motor driver 200, to adjust phase, amplitude, and/or frequency of SVPWM in the plurality of signals (P1, P2, P3, and P4) and/or the plurality of AC signals (M1 and M2).

According to an embodiment, the PWM amplifier 220 may include a plurality of switches (221a, 221b, 222a, 222b, 223a, 223b, 224a, 224b) each controlled with a corresponding switch control signal (S1.1, $\overline{S1.1}$, S1.2, $\overline{S1.2}$, S2.1, $\overline{S2.1}$, S2.2, and $\overline{S2.2}$). A first set of the switches 221a, 222a, 223a, 224a may connect their respective output terminals to a first voltage supply (VDD) A second set of the switches 221b, 222b, 223b, 224b may connect their respective output terminals to a second voltage supply (ground). The switches may be provided in an H bridge configuration. The switches 221a, 221b, 222a and 222b may be differentially driven so that when one switch drives output P1 to a first supply voltage (e.g., switch 221a drives P1 to VDD), a counterpart switch drives the other output P2 to the counterpart supply voltage (e.g., switch 222b drives P2 to ground). Similarly, switches 223a, 223b, 224a and 224b may be differentially driven so that when one switch drives output P3 to a first supply voltage (e.g., switch 223a drives P3 to VDD), a counterpart switch drives the other output P4 to the counterpart supply voltage (e.g., switch 224b drives P4 to ground). The switches 221a, 221b, 222a, 222b, 223a, 223b, 224a, 224b may be metal-oxide-semiconductor field effect transistors (MOSFETs).

Optionally, the PWM amplifier 220 may include capacitors 228 and 229 connected between supplies VDD and GND, which are coupled to the amplifier's outputs by respective switches 222a, 222b, 224a and 224b.

Signal S1.1 may be opposite or inverted in digital state as $\overline{S1.1}$, such that when signal S1.1 turns on switch 221a, signal $\overline{S1.1}$ turns off switch 221b, and when signal S1.1 turns off switch 221a, signal $\overline{S1.1}$ turns on switch 221b. Signal S1.2 may be opposite in digital state as $\overline{S1.2}$. Signal S2.1 may be opposite in digital state as $\overline{S2.1}$. Signal S2.2 may be opposite in digital state as $\overline{S2.2}$. Additionally, the plurality of signals (P1, P2, P3, and P4) may be generated as corresponding to the digital state of each corresponding control signal (S1.1, S1.2, S2.1, S2.2). As indicated, the switches 221a, 221b, 222a, 222b, 223a, 223b, 224a, 224b may be differentially driven to drive the output signals P1 and P2 to different voltage levels from each other (P1 to VDD when P2 is driven to ground and vice versa) and also to drive the output signals P3 and P3 to different voltage levels from each other (P4 to VDD when P3 is driven to ground and vice versa) By this configuration, control signals (S1.1, $\overline{S1.1}$, S1.2, $\overline{S1.2}$, S2.1, $\overline{S2.1}$, S2.2, and $\overline{S2.2}$) may control the modulation of the plurality of signals (P1, P2, P3, and P4).

The controller 210 may generate the switch control signals (S1.1, $\overline{S1.1}$, S1.2, $\overline{S1.2}$, S2.1, $\overline{S2.1}$, S2.2, and $\overline{S2.2}$), or may generate the switch control signals (S1.1, S1.2, S2.1, S2.2), and the inverted switch control signals ($\overline{S1.1}$, $\overline{S1.2}$, $\overline{S2.1}$, and $\overline{S2.2}$) may be generated from the switch control signals (S1.1, S1.2, S2.1, S2.2) using inverters.

The converter 230 is shown as an LC oscillator in this embodiment. The converter 230 may include a plurality of inductors (232a, 232b, 232c, 232d), a plurality of capacitors (234a, 234b, 234c, 234d), and a plurality of isolators (236a and 236b). In the embodiment illustrated in FIG. 2, the isolators 236a, 236b are illustrated as transformer-based isolators but the principles of the present invention apply to other types of isolators, for example, capacitor-based isolators.

The inductors 232a, 232b, 232c, 232d and capacitors 234a, 234b, 234c, 234d may be arranged in pairs to form respective filters. As shown, inductor 232a and capacitor 234a may form a filter for signal P1, inductor 232b and capacitor 234b may form a filter for signal P2, inductor 232c and capacitor 234c may form a filter for signal P3, and inductor 232d and capacitor 234d may form a filter for signal P4. The filters in converter 230 may be considered as filters on the primary side (input side) of the isolators (236a and 236b). Thus, outputs from the filters may be applied to opposite terminals of the respective isolators 236a, 236b.

In the embodiment of FIG. 2, the filters may be low pass filters. With this configuration, each of the signals (P1, P2, P3, P4) may be filtered, to smooth out and/or remove noise from modulation harmonics in the digital pulses the signals (P1, P2, P3, P4). Filtered pairs of signals from the signals (P1, P2, P3, P4) may be connected to the transformers 236a and 236b. For example, filtered pairs of signals from P1 and P2 may be connected to the input of the transformer 236a, and filtered pairs of signals from P2 and P3 may be connected to the input of the transformer 236b. With this configuration, the output of the transformers may be generated based upon the differences between the smoothed out analog signals from each pair of signals (the differences of filtered pairs of signals from P1 and P2, the differences of filtered pairs of signals from P3 and P4).

The two output nodes of transformer 236a may be connected to the input nodes Va and Vcommon of the motor 290. The two output nodes of transformer 236b may be connected to the input nodes Vb and Vcommon of the motor 290.

In the embodiment of FIG. 2, the filters may include band pass filters, digital filters, among others.

Figure 3:
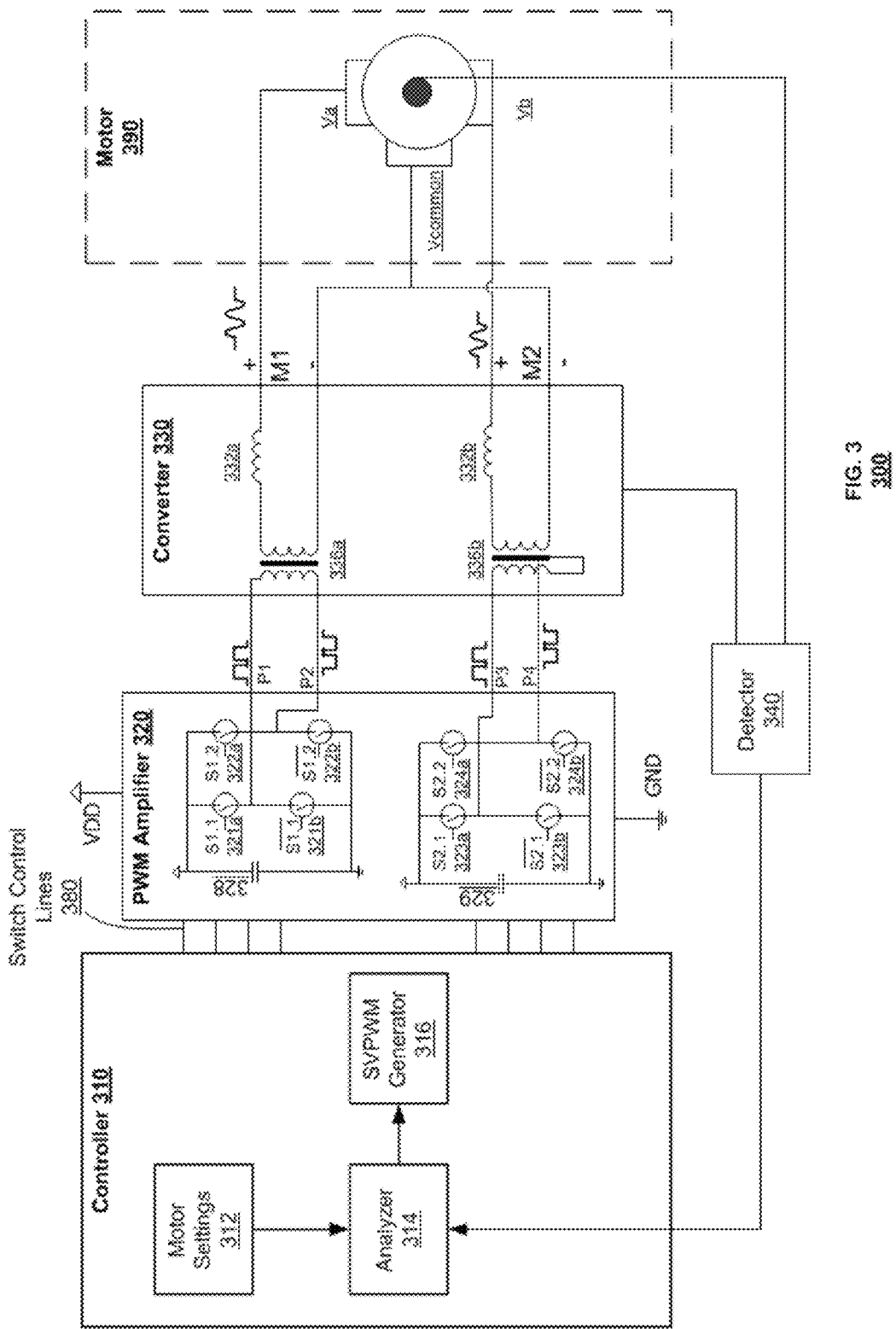
FIG. 3 illustrates a motor driver according to a further embodiment of the present invention.

FIG. 3 illustrates an exemplary motor driver 300 according to a further embodiment of the present invention. The motor driver 300 may be an implementation of the motor driver 100 in FIG. 1. Again, the motor driver 300 may include a controller 310, a PWM amplifier 320, a converter 330 and a detector 340. In this embodiment, the converter 330 may be differentially-driven by two pairs or pulse signals, P1 and P2, and P3 and P4.

The controller 310 may control the plurality of PWM amplifier 320 to generate a plurality of signals (P1, P2, P3, and P4), according to SVPWM. The converter 330 may convert the plurality of signals into a plurality of AC signals (M1 and M2) to drive a motor 390. The controller 310 may monitor, via the detector 340, current or voltage in the motor driver 300.

According to an embodiment, the PWM amplifier 320 may include a plurality of switches (321a, 321b, 322a, 322b, 323a, 323b, 324a, 324b) each controlled with a corresponding switch control signal (S1.1, $\overline{S1.1}$, S1.2, $\overline{S1.2}$, S2.1, $\overline{S2.1}$, S2.2, and $\overline{S2.2}$). Additionally, one or more capacitors (328 and 329) may be connected between supplies VDD and GND to store energy.

The plurality of switches plurality of switches (321a, 321b, 322a, 322b, 323a, 323b, 324a, 324b) may include a plurality of H-bridge metal-oxide-semiconductor field effect transistors (MOSFETs). The plurality of switches (321a, 321b, 322a, 322b, 323a, 323b, 324a, 324b) may form a plurality of branches. For example, switches 321a and 321b may be connected in series between VDD and GND, to form one branch, to generate the signal P1 between switches 321a and 321b. Switches 322a and 322b may form one branch to generate the signal P2. Switches 323a and 323b may form one branch to generate the signal P3. Switches 324a and 324b may form one branch to generate the signal P4.

Signal S1.1 may be opposite or inverted in digital state as $\overline{S1.1}$, such that when signal S1.1 turns on switch 321a, signal $\overline{S1}$ turns off switch 321b, and when signal S1.1 turns off switch 321a, signal $\overline{S1.1}$ turns on switch 321b. Signal S1.2 may be opposite in digital state as $\overline{S1.2}$. Signal S2.1 may be opposite in digital state as $\overline{S2.1}$. Signal S2.2 may be opposite in digital state as $\overline{S2.2}$. By this configuration, the plurality of switches (321a, 321b, 322a, 322b, 323a, 323b, 324a, 324b) may not cause a short between VDD and GND. Additionally, the plurality of signals (P1, P2, P3, and P4) may be generated as corresponding to the digital state of each corresponding control signal (S1.1, S1.2, S2.1, S2.2). By this configuration, control signals (S1.1, $\overline{S1.1}$, S1.2, $\overline{S1.2}$, S2.1, $\overline{S2.1}$, S2.2, and $\overline{S2.2}$) may control the modulation of the plurality of signals (P1, P2, P3, and P4).

The controller 310 may generate the switch control signals (S1.1, $\overline{S1.1}$, S1.2, $\overline{S1.2}$, S2.1, $\overline{S2.1}$, S2.2, and $\overline{S2.2}$), or may generate the switch control signals (S1.1, S1.2, S2.1, S2.2), and the inverted switch control signals ($\overline{S1.1}$, $\overline{S1.2}$, $\overline{S2.1}$, and $\overline{S2.2}$) may be generated from the switch control signals (S1.1, S1.2, S2.1, S2.2) using inverters.

The converter 330 may include a plurality of inductors (332a, 332b), and a plurality of isolators (336a and 336b). In this embodiment, the isolators 336a, 336b may be connected directly to outputs of the PWM amplifier 320. Inductors 332a, 332b may be provided as filtering circuitry on a secondary-side of the isolators 336a, 336b, which may provide filtering in a voltage domain of the motor 190 rather than a voltage domain of the PWM amplifier 320.

Pairs of the signals (P1, P2, P3, P4) may be connected to the transformers 336a and 336b. For example, P1 and P2 may be connected to the input of the isolator 336a, and P2 and P3 may be connected to the input of the isolator 336b. With this configuration, the output of the isolators (336a, 336b) may be generated based upon the differences between each pair of signals (the differences of P1 and P2, the differences of P3 and P4).

Each of the plurality of inductors (332a, 332b) may form a filter, connected in series with one of the output nodes of a corresponding transformer (336a, 336b). The filters in converter 330 may be provided as filters on the secondary side (output side) of the transformers (336a and 336b). The filters in converter 330 may be provided as low pass filters formed by the inductors (332a, 332b) with parasitic capacitance between the nodes of the motor 390. However, other filter configurations may be possible in converter 330. With this configuration, each of the signals (P1, P2, P3, P4) may be transformed first, and then the output of the transformers (336a, 336b) may be filtered, to smooth out and/or remove noise from modulation harmonics in the output of the transformers (336a, 336b).

The filtered output signal M1 of transformer 336a may be connected to the input nodes Va and Vcommon of the motor 390. The filtered output signal M2 of transformer 336b may be connected to the input nodes Vb and Vcommon of the motor 390.

The designs illustrated in FIGS. 2 and 3 each have their own advantages. In each case, the transformers 236a, 236b (FIG. 2) and 336a, 336b (FIG. 3) may have a predetermined step up ratio, such as 1:20 or more. Accordingly, the primary side current may be larger than the secondary side current in each case. In the FIG. 2 design, the inductors 232a-232d may be coupled to the primary side of their associated transformers 236a, 236b and may carry a larger current than the inductors 332a, 332b of FIG. 3. In this case, the inductors 232a-232d may be larger devices to carry the relatively larger current and they may have relatively small inductances (typically in the pH range). In the FIG. 3 design, the inductors 332a, 332b may be provided on the secondary side of their associated transformers 336a, 336b. The inductors 332a, 332b may be smaller devices that carry the relatively smaller current than their FIG. 2 counterparts and they may have relatively larger inductances (typically in the mH range). The FIG. 2 design also has relatively larger device count which may affect manufacturing cost and complexity. Thus, the FIG. 2 design may have higher manufacturing costs than the FIG. 3 design but it may have greater efficiency because the inductors are on the primary side of the transformers. Circuit designers likely will balance these performance and complexity considerations as they tailor the principles of the present invention to suit their individual application needs.

FIGS. 4A-4D illustrate a conceptual model for generating a sinusoidal signal according to SVPWM techniques, according an embodiment of the present invention. FIG. 4A illustrates a portion of an idealized sinusoidal signal to be generated as one of the modulated voltage AC signals M1 or M2 of the converter 130. The sinusoidal signal is shown as having a period $T_p$ and having been divided into a plurality of switching periods 411-420, each having duration Ts. In this example, the period $T_p$ is shown as divided into 10 switching periods 411-420 with 5 switching periods 411-415 corresponding to the positive portion of the sinusoid, and 5 switching periods 416-420 corresponding to the negative portion of the sinusoid. Thus, the example of FIG. 4A illustrates a "5 pulse" modulation scheme.

The principles of the present invention may be applied to any order pulse modulation scheme. For example, the principles of the present invention apply to 1 pulse modulation schemes, 3 pulse modulation schemes and higher order pulse modulation schemes (e.g., 15 pulse schemes), as discussed below. Thus, the number N of switching periods and the duration $$Ts\left(Ts = \frac{T_p}{2N}\right)$$

of the switching periods 411-420 may vary with N, which represents the order of the pulse modulation scheme.

The period Tp may be determined initially from motor settings 112 (FIG. 1) but may be revised as necessary by operation of the controller 110.

FIG. 4B illustrates a vector space from which a model for an SVPWM driving pattern may be derived. The sinusoid's period Tp is represented by a 360° vector space which is populated by seven vectors V0-V6. Vectors V1-V6 divide the space into 6 sectors S0-S5. During operation, a command vector V* may rotate within the vector space, transitioning among discrete locations during each switching interval 411-420. The command vector V* may start at a predetermined angle $\theta_{init}$ and, for each switching period, rotate to a new angle given by $\theta_{new} = \theta_{current} + \Delta\theta$, where $$\Delta\theta = \frac{\pi}{N}.$$

Two instances of the command vector V* are illustrated in FIG. 4B ($V_1^*$ and $V_2^*$); they correspond to locations of the command vector V* at two different times.

The example of FIG. 4B is appropriate for a 5 pulse modulation scheme. It illustrates both instances $V_1^*$, $V_2^*$ of the command vector V* as located in sector S0. In this example, the command vector V* would rotate approximately 36 degrees $$\left(\Delta\theta = \frac{\pi}{5}\right)$$

in each switching period 411-420. In different implementations, having different orders of pulse modulation, the command vector V* would rotate at different increments of Δθ.

For each switching period, the sector number sector_num for command vector V* may be calculated by the following:

$$\text{sector\_num} = \text{int}\left(\frac{\theta}{\pi/3}\right)$$

where θ represents the angle of the vector V* counterclockwise relative to Vector $V_1$, and int(x) is a function for rounding down a number x to the next lowest integer.

As illustrated in FIGS. 4C and 4D, each switching period 411-420 may be divided into a plurality of modulation periods ($T_0$, $T_1$, $T_2$) that govern the PWM signals to be generated in the respective switching period. Although the different switching periods 411-420 have a common duration Ts, the durations of the modulation periods $T_0$, $T_1$, $T_2$ may vary based on the command vector's position for each switching period 411-420.

If V* is in sector 0 (between adjacent vectors $V_1$ and $V_2$), or sector 2, or sector 4, for example, then the durations of the modulation periods $T_0$, $T_1$, and $T_2$ may be calculated as follows:

$$T_2 = T_s \times f_m \times \sin(\theta),$$

$$T_1 = T_s \times f_m \times \sin(60° - \theta), \text{ and}$$

$$T_0 = T_1 - T_2,$$

where θ represents the angle of the vector V*, $f_m$ represents a modulation factor determined by a ratio between the command vector V* and the vectors V1-V6 that define the vector space in which the command vector V* rotates. For example, the modulation factor may be given by $$f_m = \frac{2 \cdot |V^*|}{\sqrt{3} \cdot |V|},$$

where |V| the magnitude of the vectors V1-V6.

If V* is in sector 1 (between adjacent vectors $V_3$ and $V_2$), or sector 3, or sector 5, for example, then the durations of the modulation periods $T_0$, $T_1$, and $T_2$ may be calculated as follows:

$$T_1 = T_s \times f_m \times \sin(\theta),$$

$$T_2 = T_s \times f_m \times \sin(60° - \theta), \text{ and}$$

$$T_0 = T_s - T_1 - T_2,$$

Here, again, θ represents the angle of the vector V*, $f_m$ represents a modulation factor determined by a ratio between the command vector V* and the vectors V1-V6 that define the vector space in which the command vector V* rotates.

FIG. 4C illustrates modulation periods $T_0$, $T_1$, and $T_2$ that may be used when the command vector V* has the position $V_1^*$ shown in FIG. 4B. FIG. 4D illustrates modulation periods $T_0$, $T_1$, and $T_2$ that may be used when the command vector V* has the position $V_2^*$ shown in FIG. 4B. Again, the duration of the modulation periods $T_9$, $T_1$, and $T_2$ may vary based on the command vector's position within the sectors, which will vary based on the pulse order that is used to generate the sinusoid.

Switch control signals may be derived from the modulation periods $T_0$, $T_1$, and $T_2$ to generate a PWM signal that corresponds to a segment of the desired sinusoid in each switching period 411-420. Exemplary PWM signals PWM1 and PWM2 are shown in FIGS. 4C and 4D for the modulation periods illustrated therein. These PWM signals may be applied to inputs of the converters 130, 230, 330 of the foregoing embodiments. The SVPWM generators 116, 216, 316 may generate switch control signals (e.g., either signals S1.1 and S1.2 or signals S2.1 and S2.2) to generate these PWM signals at the input over the converters 130, 230, 330.

Figure 5:
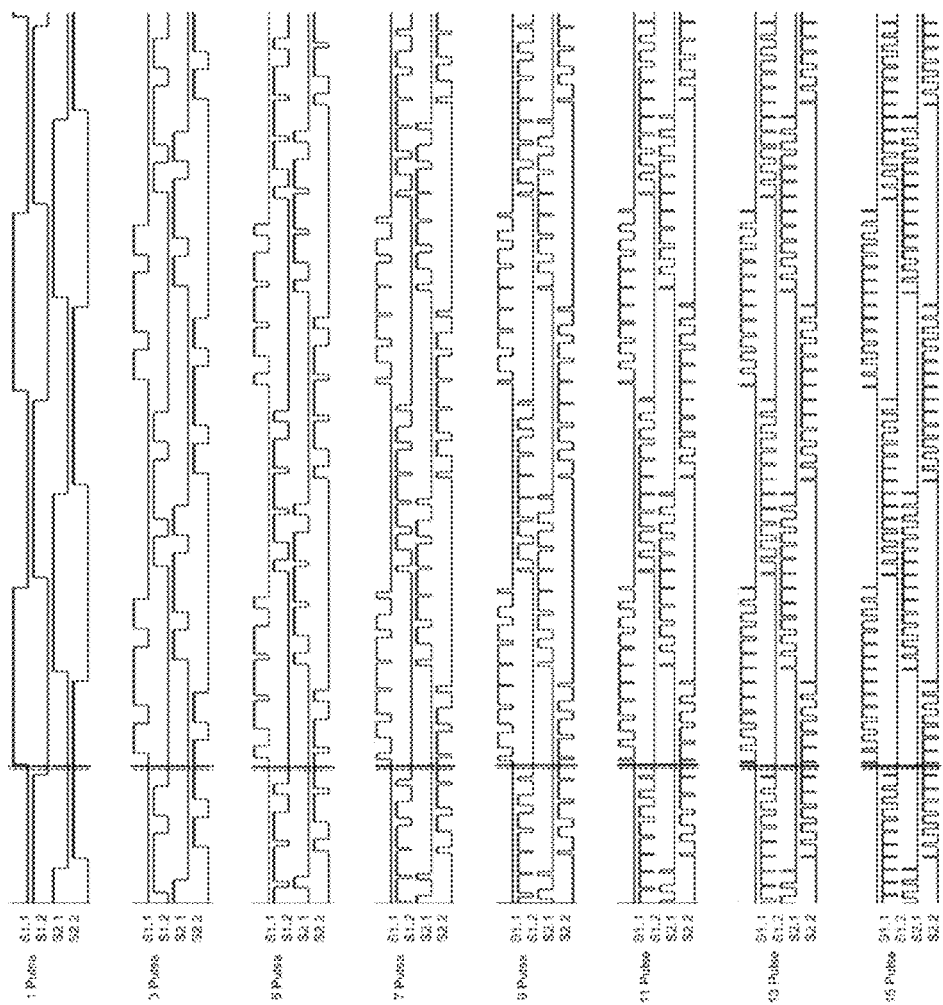
FIG. 5 illustrates signal timing diagrams exemplary modulation waveforms according to an embodiment of the present invention.

FIG. 5 illustrates signal timing diagrams 500 exemplary modulation waveforms according to an embodiment of the present invention.

As illustrated in FIG. 5, the switch control signals (S1.1, S1.2, S2.1, S2.2) are modulated according to SVM calculations shown above, for several different switching period schemes, 1 pulse to 15 pulse schemes. That is, for each ½ period of the AC signals M1 and M2, the switch control signals (S1.1, S1.2, S2.1, S2.2) may each have 1 switching/modulation pulse/period or multiple pulses/periods (with equal or different period durations). 1 to 15 pulse schemes here in FIG. 5 merely illustrate some possible SVM modulation schemes, but the configuration of the motor driver may not be limited to 1 to 15 pulse schemes. Other schemes are possible, such as even pulse number schemes.

However, as higher number of pulses may have higher switching/modulation frequency for the hardware in the motor drivers, it may be more efficiency and cost effective to have low as possible number of pulses that generates sufficiently sinusoidal waveforms for AC signals M1 and M2. For example, a 5 pulse scheme for the SVM modulation may be sufficient to generate low noise sinusoidal waveforms for AC signals M1 and M2, without the need to significantly increase the modulation frequency in the motor drivers.

Additionally, the motor drivers may be implemented to have multiple different pulse modes, and/or be able to switch from different pulse modes as needed (for example, to change from a 5 pulse mode to a 7 pulse mode). This may be done for example, when the motor driver needs to compensate for changes of amplitude multiplication in the motor driver.

As the motor and the circuit ages, the resonance frequency of the circuit may change, which may cause the voltage amplitude multiplication (from the input to the output of the converter 130) to change. Additionally, different motors may have different input voltage requirements. Higher switching/modulation frequency may increase the voltage amplitude multiplication, and lower switching/modulation frequency may decrease the voltage amplitude multiplication. Thus, the motor drivers may adjust and compensate for the voltage amplitude multiplication overtime by changing to different pulse modes as needed.

By this configuration, the motor driver may not require additional complex hardware to compensate for change in the voltage amplitude multiplication, and may also accommodate different motor input voltage level requirements.

The motor drivers as illustrated above may have very good power efficiency and may support multiple pulse number modes (2~30), wide and accurate output frequency range (20~100 KHz@10 Hz resolution), wide and accurate output phase range (−127~127 @1-degree resolution), and high voltage amplitude sinusoidal output. To support high output frequency (>50 KHz) and high pulse numbers (>10 pulses/cycle), a high speed (supporting up to 3 MHz switching frequency) SVPWM generator 116 and high efficient (>90%) high speed (up to 3 MHz switching frequency) switch devices in PWM amplifier 120 may be provided. The SVPWM generator 116 may be optimized to increase its rate of operation such as by using LUTs to store pre-calculated coefficients.

Additionally, the motor drivers may have the capability to measure the USM motor's resonant frequency change, by detecting the motor's power factor change using the detector (140), for example measuring the phase between voltage and current at the converter (130) and/or the motor (190).

One or more components of the motor driver (100) may be integrated into one or more semiconductor chip or die.

The controllers of FIGS. 2 and 3 may operate according to the foregoing principles.

Figure 6:
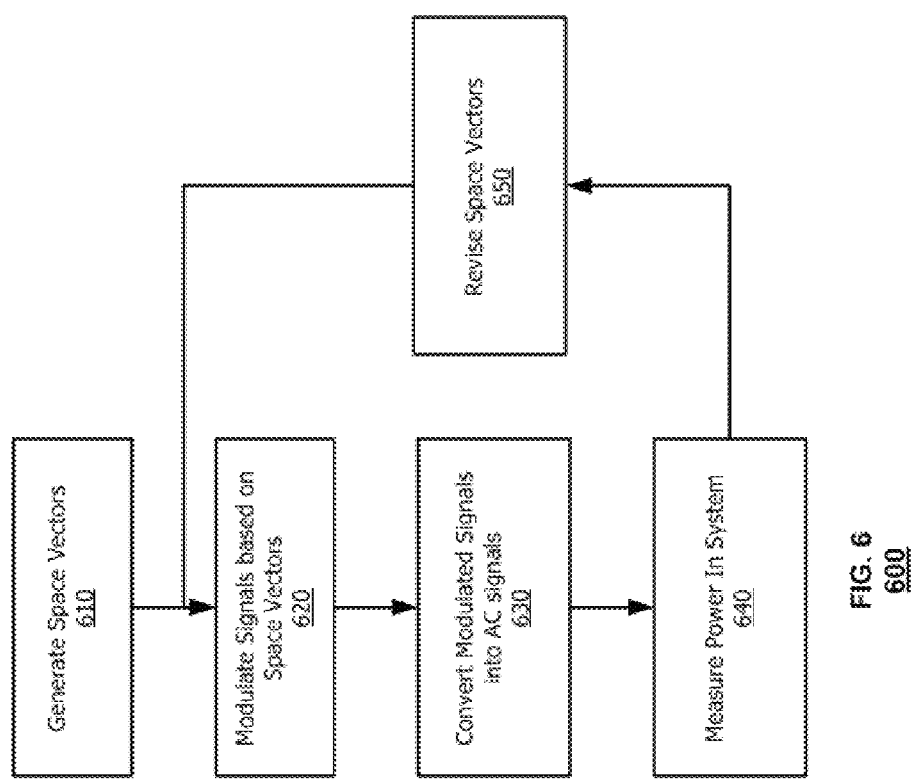
FIG. 6 illustrates an exemplary method according to an embodiment of the present invention.

FIG. 6 illustrates an exemplary method 600 according to an embodiment of the present invention. At block 610, the controller may generate a plurality of vectors, one for each of a plurality of AC signals (M1 and M2). At block 620, the controller may modulate the switch control signals (S1.1, $\overline{S1.1}$, S1.2, $\overline{S1.2}$, S2.1, $\overline{S2.1}$, S2.2, and $\overline{S2.2}$) according to the calculated vectors to produce signals (P1, P2, P3, P4) at the switches. At block 630, the converter may convert the modulated signals (P1, P2, P3, P4) into AC signals (M1 and M2). At block 640, the detector may measure the power measurements in the converter or the motor. The measurements are then fed back to the controller, which may adjust the generation of the vectors and modulation of the switch control signals. At block 650, the controller may revise the plurality of vectors, one for each of a plurality of AC signals (M1 and M2), based upon the adjustments, for modulation in block 620.

Although the disclosure has been described with reference to several exemplary embodiments, it is understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular means, materials and embodiments, the disclosure is not intended to be limited to the particulars disclosed; rather the disclosure extends to all functionally equivalent structures, methods, and uses such as are within the scope of the appended claims.

The present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure.

Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "disclosure" merely for convenience and without intending to voluntarily limit the scope of this application to any particular disclosure or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

We claim:

1. A motor driver for a motor, comprising:
   a space vector modulator to generate two sets of driving signals according to space vector pulse width modulation techniques;
   a controller to generate control signals to the space vector modulator;
   a converter to generate a plurality of AC signals from the driving signals; and
   a detector to measure current or voltage in the converter or the motor,
   wherein the controller alters the control signals to the space vector modulator based on a comparison of reference motor settings to measurements from the detector to adjust a characteristic of the AC signals generated by the converter.

2. The motor driver of claim 1, wherein the characteristic is one of a frequency, amplitude, or phase angle of the AC signals.

3. The motor driver of claim 1, wherein the space vector modulator comprises a plurality of transistors switches in H bridge configuration.

4. The motor driver of claim 1, wherein the space vector modulator comprise a plurality of MOSFETs in an H-bridge configuration.

5. The motor driver of claim 1, wherein the controller generates the space vectors each correspond to one of a plurality of modulation period of the plurality of the AC signals.

6. The motor driver of claim 1, wherein the converter comprises a pair of oscillators each driven by a pair of driving signals.

7. The motor driver of claim 1, wherein the converter comprises an isolator.

8. The motor driver of claim 7, wherein the converter further comprises a low-pass filter provided on a primary side of the isolator.

9. The motor driver of claim 7, wherein the converter further comprises a low-pass filter provided on a second side of the isolator.

10. The motor driver of claim 1, wherein the converter comprises a filter.

11. The motor driver of claim 1, wherein the controller compares measured voltages from the detector to predetermined settings to make adjustments.

12. A method of controlling a motor driver for a motor, comprising:
   generating a plurality of driving signals according to space vector pulse width modulation techniques, the driving signals initially generated according to initial settings for a motor,
   converting the driving signals to first AC signals, the first AC signals to be applied to the motor,
   measuring consumption of the first AC signals by the motor,
   revising the initial settings of the motor according to an analysis of the measured consumption of the first AC signals by the motor,
   generating a new set of driving signals according to space vector pulse width modulation techniques, using the revised settings of the motor, and
   converting the new set of driving signals to second AC signals, the second AC signals to be applied to the motor.

13. The method of claim 12, wherein the driving signals are generated by a pair of H-bridge circuits.

14. The method of claim 12, wherein the converting comprises driving a pair of oscillators by a pair of driving signals.

15. The method of claim 12, wherein the converting comprises generating the AC signals across an isolator.

16. The method of claim 12, wherein the converting comprises filtering by a low-pass filter provided on a primary side of the isolator.

17. The method of claim 12, wherein the converting comprises filtering by a low-pass filter provided on a second side of the isolator.

18. The method of claim 12, wherein the converting comprises filtering.

19. The method of claim 12, wherein the revising comprises comparing measured consumption to predetermined settings to make adjustments.

20. A non-transitory computer readable medium, storing computer instructions, executable by a processor to control a motor driver for a motor, to perform:
   generating a plurality of driving signals according to space vector pulse width modulation techniques, the driving signals initially generated according to initial settings for a motor,
   converting the driving signals to first AC signals, the first AC signals to be applied to the motor,
   measuring consumption of the first AC signals by the motor,
   revising the initial settings of the motor according to an analysis of the measured consumption of the first AC signals by the motor,
   generating a new set of driving signals according to space vector pulse width modulation techniques, using the revised settings of the motor, and
   converting the new set of driving signals to second AC signals, the second AC signals to be applied to the motor.

* * * * *